July 3, 1934.   H. E. PRESTON   1,965,317
MECHANICAL STOKER
Filed Jan. 7, 1931   8 Sheets-Sheet 2
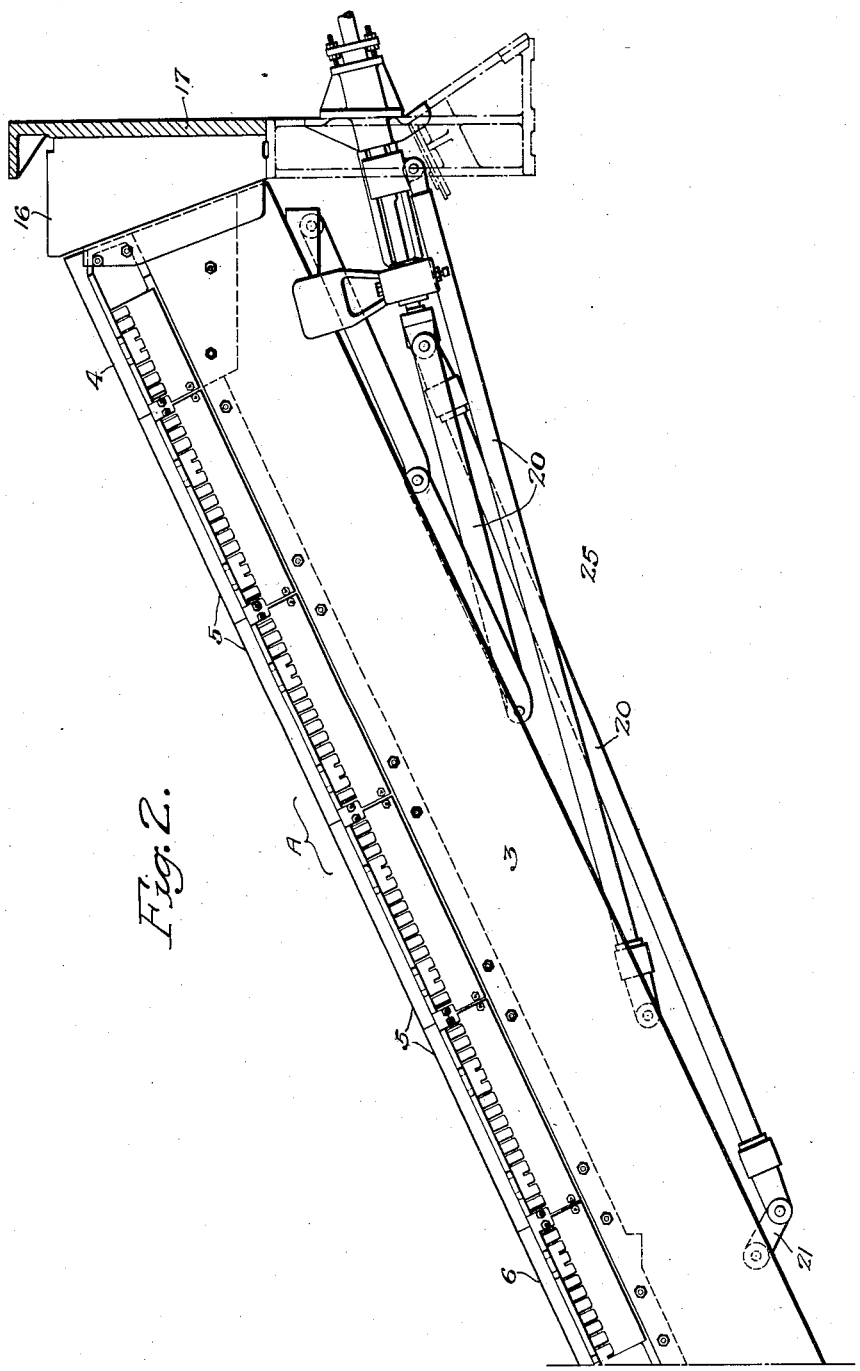

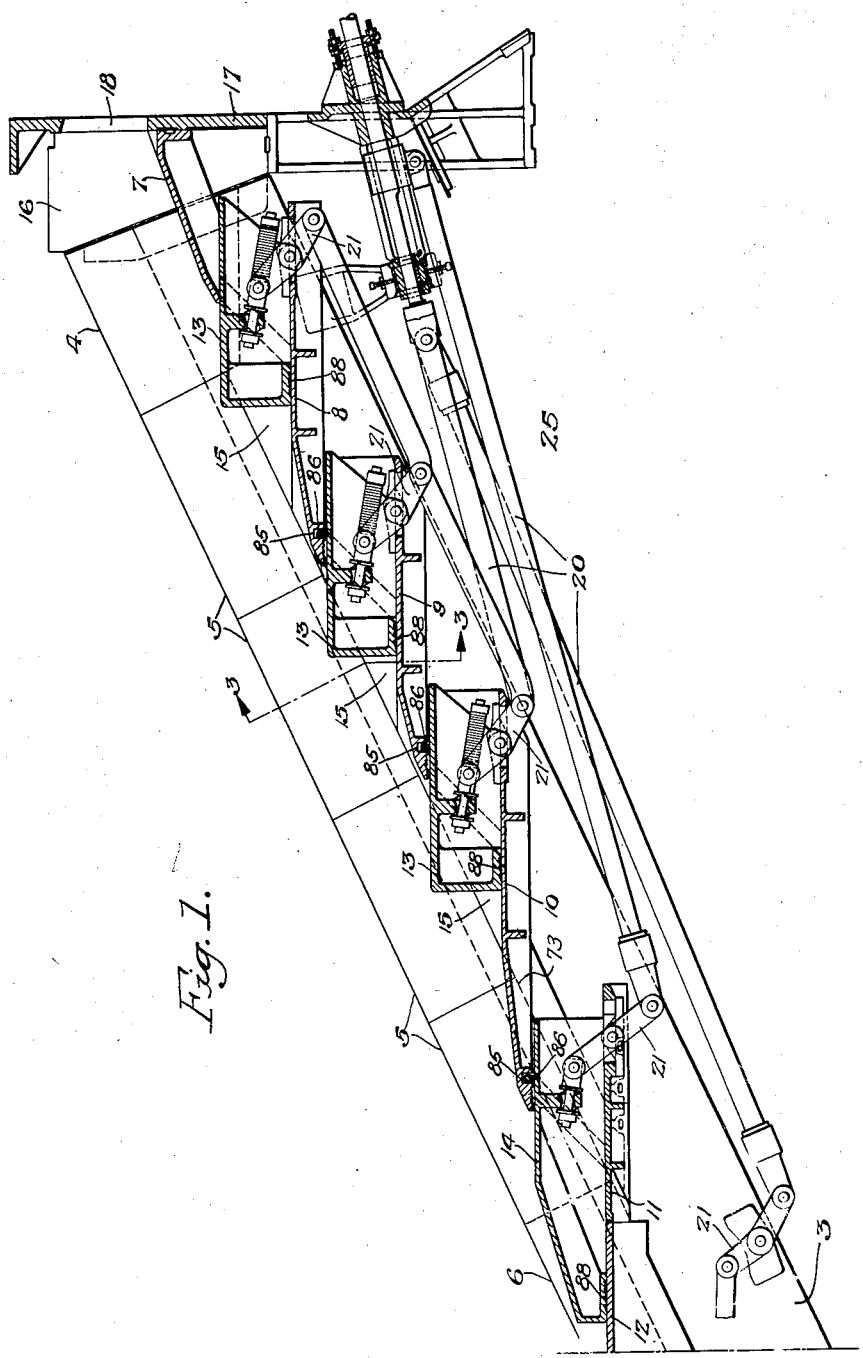

July 3, 1934.    H. E. PRESTON    1,965,317
MECHANICAL STOKER
Filed Jan. 7, 1931    8 Sheets-Sheet 3
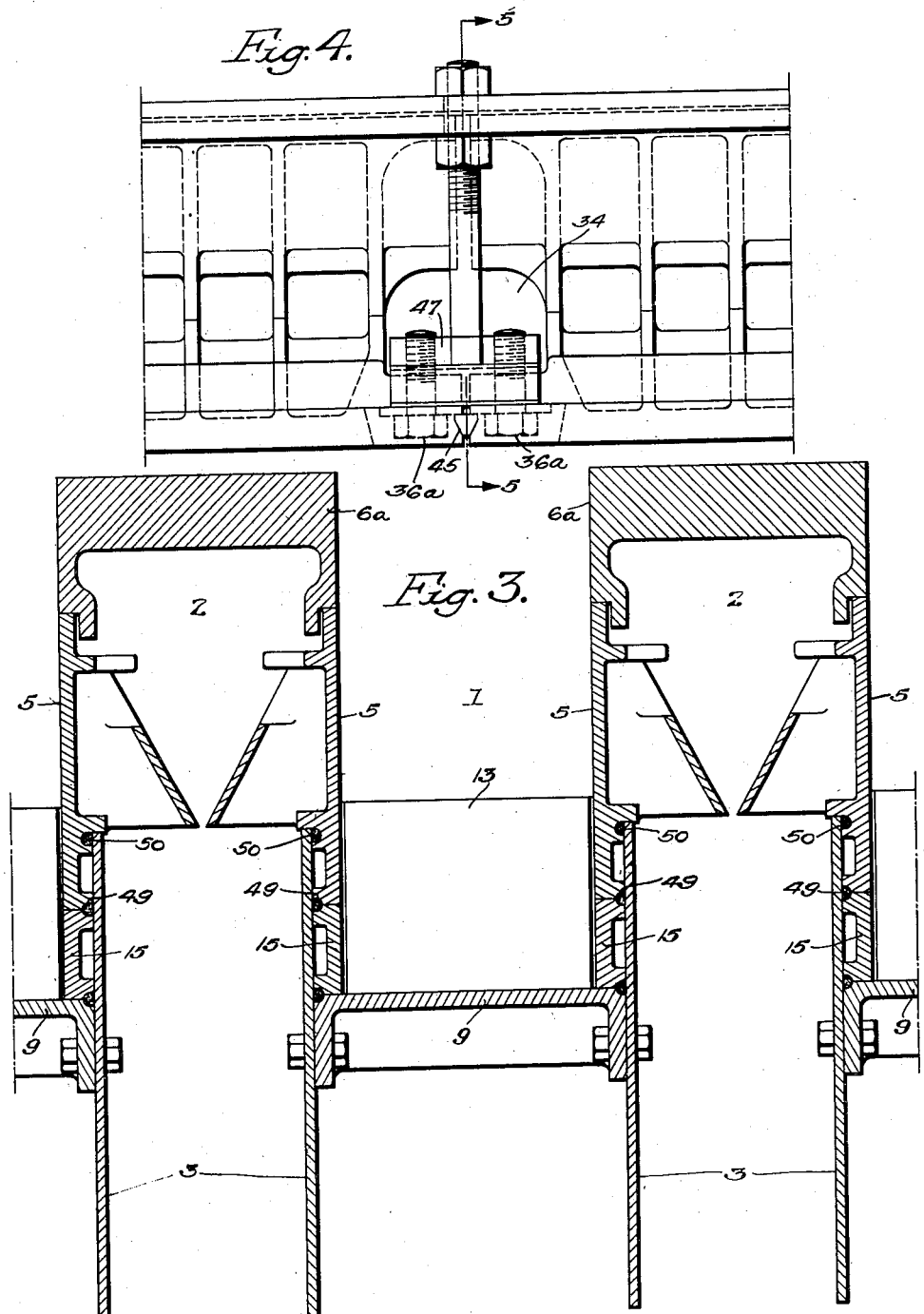

July 3, 1934.  H. E. PRESTON  1,965,317

MECHANICAL STOKER

Filed Jan. 7, 1931  8 Sheets-Sheet 4

Inventor:-
Herbert E. Preston,
by his Attorneys,
Howson & Howson

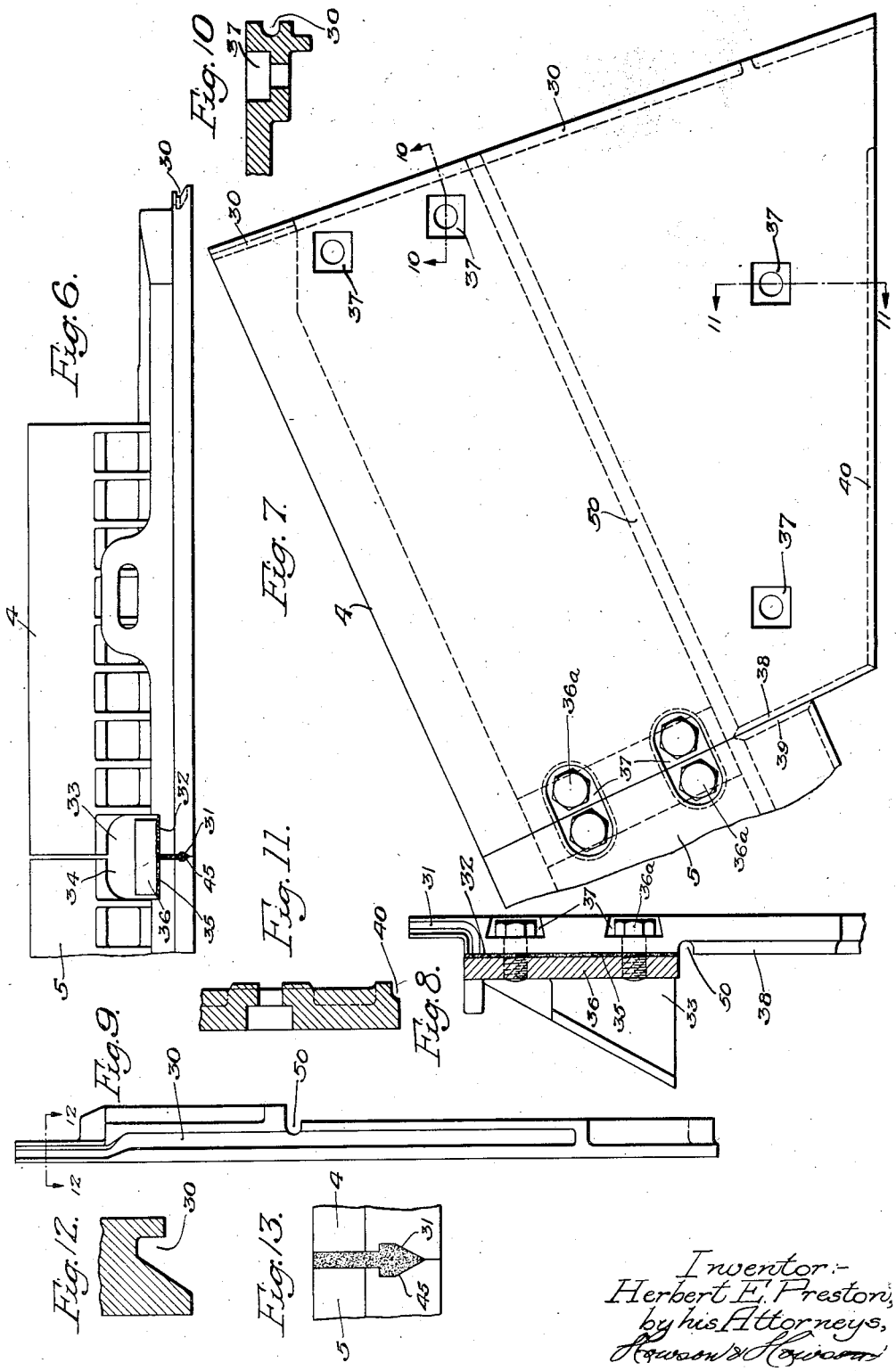

July 3, 1934.  H. E. PRESTON  1,965,317
MECHANICAL STOKER
Filed Jan. 7, 1931   8 Sheets-Sheet 6
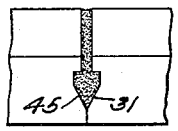
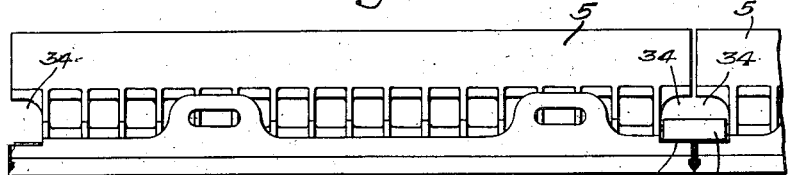
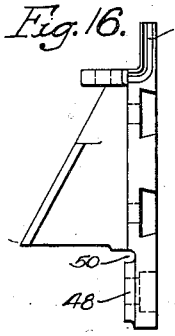
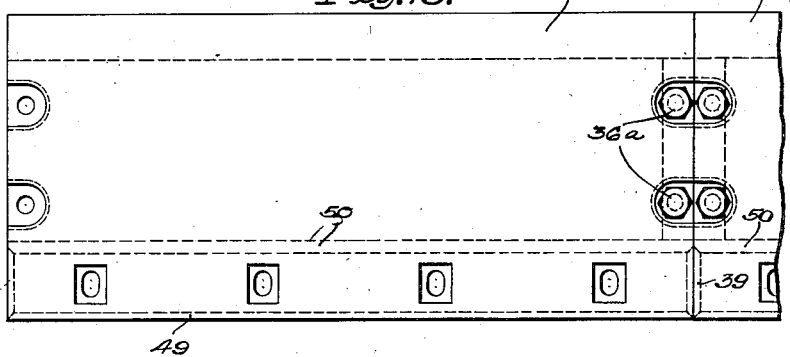
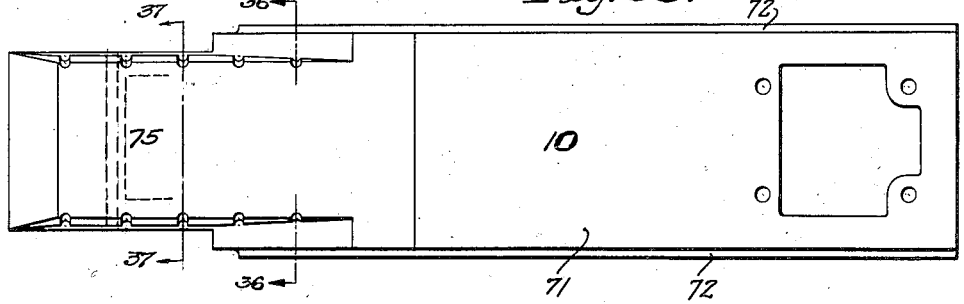
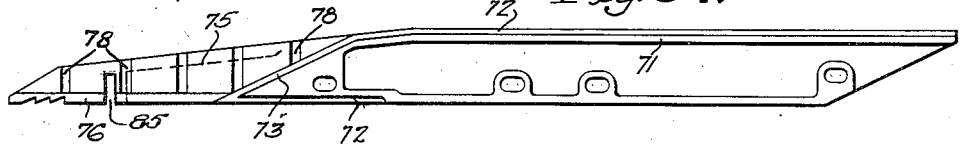
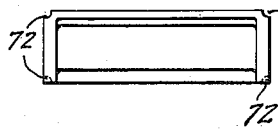
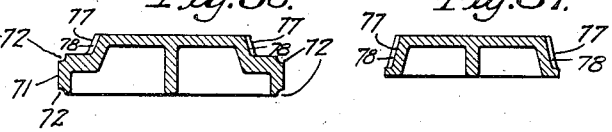
Inventor:-
Herbert E. Preston,
by his Attorneys,
Howson & Howson July 3, 1934. H. E. PRESTON 1,965,317
MECHANICAL STOKER
Filed Jan. 7, 1931 8 Sheets-Sheet 7
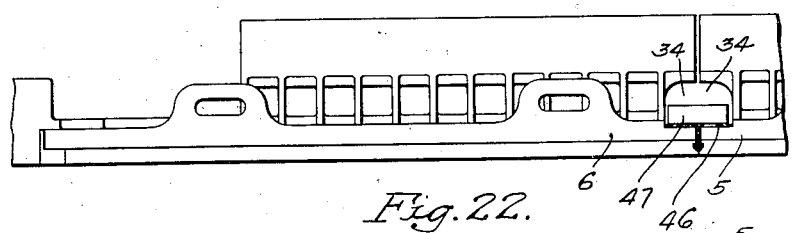
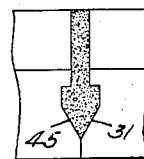
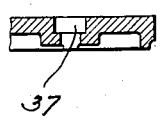
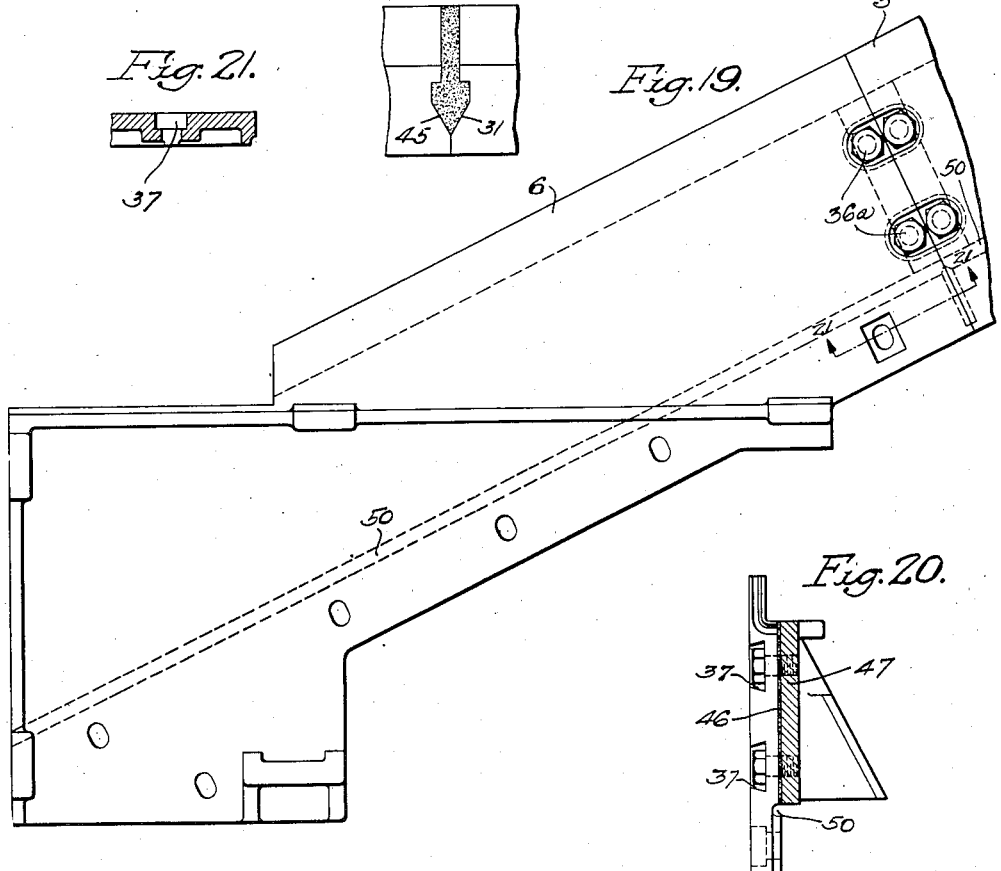
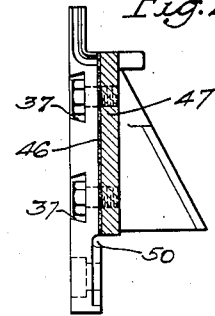
Inventor.-
Herbert E. Preston,
by his Attorneys,
Howson & Howson

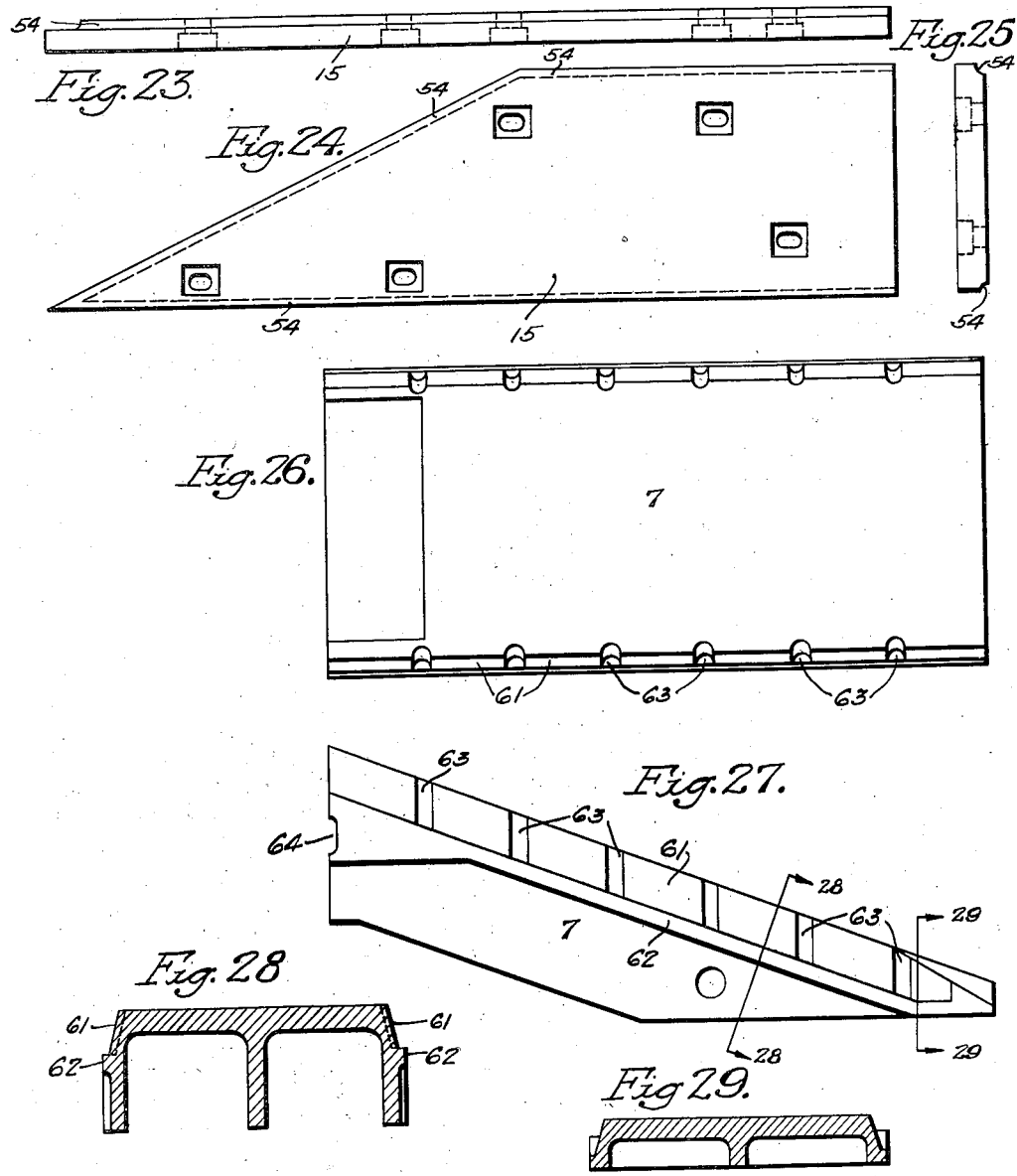

Patented July 3, 1934

1,965,317

UNITED STATES PATENT OFFICE 1,965,317

MECHANICAL STOKER

Herbert E. Preston, Philadelphia, Pa., assignor to American Engineering Company, Philadelphia, Pa., a corporation of Pennsylvania Application January 7, 1931, Serial No. 507,227

2 Claims. (Cl. 110—44)

This invention relates to improvements in mechanical underfeed stokers of the type comprising alternately arranged tuyère and retort sections, and the principal object of the invention is to provide a stoker of the stated type which shall be generally more efficient and durable than the stokers made in accordance with the prior practice.

A more specific object of the invention is to provide a stoker of the stated character in which admission of combustion air to the fuel bed is confined entirely to the tuyères in accordance with their normal function.

To the aforesaid end, a further object of the invention is to provide a stoker of the stated type in which the retorts are sealed to exclude combustion air therefrom.

Still another object of the invention is to provide a stoker wherein provision is made for packing the joints between the various structural elements forming the retorts and between these elements and the various fuel feeding elements operating within the retorts, thereby to effectively exclude combustion air from the retorts below the level of the adjacent tuyère sections.

The invention further resides in certain novel structural features hereinafter set forth and illustrated in the attached drawings, in which:

Figure 1 is a longitudinal sectional view through one of the retorts of a mechanical underfeed stoker made in accordance with my invention;

Fig. 2 is a longitudinal sectional view through one of the tuyères of the stoker grate structure;

Fig. 3 is a fragmentary transverse sectional view on the line 3—3 of Fig. 1 embracing two of the tuyères and the intervening retort;

Fig. 4 is a fragmentary plan view of that portion of one side of a retort embraced by the bracket A, Fig. 2;

Figs. 6 and 7 are, respectively, plan and side elevational views of one of the upper retort side plates, and show a portion of the adjacent plate;

Fig. 8 is an elevational view showing the lower edge of the side plate, the junction plate being shown in section;

Fig. 9 is an elevational view showing the upper edge of the side plate;

Fig. 10 is a section on the line 10—10, Fig. 7;

Fig. 11 is a section on the line 11—11, Fig. 7;

Fig. 12 is a section on the line 12—12, Fig. 9;

Fig. 13 is a fragmentary enlargement of the joint between the lower edge of the said side plate and the abutting upper edge of the next lower side plate;

Figs. 14 and 15 are, respectively, top plan and front elevational views of one of the intermediate retort side plates and a portion of an adjoining plate;

Fig. 16 is an elevational view showing the construction of the end edges of the said intermediate side plate;

Fig. 17 is a fragmentary enlargement of the joint between the ends of adjacent intermediate side plates;

Figs. 18 and 19 are, respectively, top plan and front elevational views of one of the lower side plates of the retort structure, together with a portion of the adjacent plate;

Fig. 20 is an elevational view showing the upper end edge of the said lower side plate, the junction plate being shown in section;

Fig. 21 is a section on the line 21—21, Fig. 19;

Fig. 22 is a fragmentary enlargement of the joint between the upper edge of the lower side plate and the abutting lower edge of the adjacent intermediate side plate;

Figs. 23 and 24 are, respectively, top plan and side elevational views of one of the tuyère-support extension plates;

Fig. 25 is a front end view of the said extension plate;

Figs. 26 and 27 are, respectively, plan and side elevational views of the top coal plate;

Figure 30:
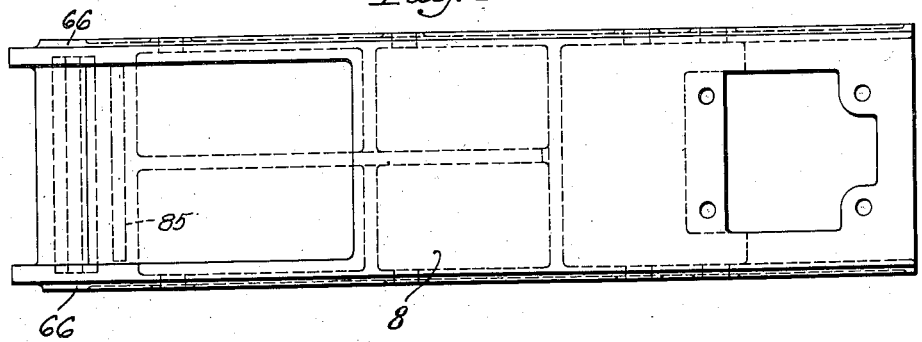
Figure 31:
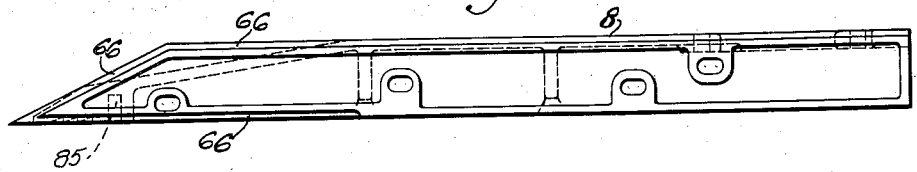
Figure 32:

Figs. 28 and 29 are sectional views taken on the lines 28—28 and 29—29, respectively, Fig. 27;

Figs. 30 and 31 are, respectively, plan and side elevational views of the top pusher spacer;

Fig. 32 is a front end elevational view of said spacer;

Figs. 33 and 34 are, respectively, plan and side elevational views of the bottom pusher spacer;

Fig. 35 is a front end view of the spacer;

Figs. 36 and 37 are sectional views on the lines 36—36 and 37—37, respectively, Fig. 33.

Referring to Figs. 1, 2 and 3 of the drawings, a stoker embodying my invention may comprise an inclined grate structure having a plurality of alternately arranged longitudinally extending retorts and tuyères 1 and 2 respectively. In the present instance, the sides of these alternating retort and tuyère sections are defined by a plurality of inclined parallel beams 3 upon the upper edge of each of which is mounted a series of plates 4—5—6 constituting the upper side walls of the retort and tuyère chambers and also supports for the tuyère elements or plates 6a which bridge the tops of the said tuyère chambers.

In the interior of each of the retort chambers and extending transversely across said retort is a top coal plate 7 and a series of dead plates 8, 9, 10, 11 and 12. Slidably mounted upon the plates 8, 9 and 10, and operating in the spaces between these plates and between the upper plate 8 and the coal plate 7 is a series of pushers 13; while a bottom pusher 14 is slidably mounted upon the dead plate 11 and operates between this plate and the overlying plate 10. Abutting the lower edges of the plates 5 is a series of side extension plates 15, these plates forming with the plates 5 flush inner wall surfaces between which the forward edges of the various pushers operate. The plates 4—5—6 and the extension plates 15 are bolted or otherwise secured to the beams 3, as hereinafter set forth. The upper terminal portions of the walls of the retorts are formed by side plates 16 which extend between the upper edges of the top plate 4 and the front wall 17 of the stoker, the latter having openings 18 communicating respectively with the upper ends of the retorts through which fuel is fed to the latter in well known manner over the coal plate 7.

The stoker grate further comprises an extension grate 19 (not shown) mounted at the lower end of the retorts, which receives the burning fuel over the dead plate 12, and this extension grate 19 and the pushers 13 and 14 are reciprocated through the medium of a series of rods 20 and levers 21 which connect the said grate and pushers to suitable power mechanism. This actuating mechanism forms no part of the present invention.

In stoker furnaces of this character, it is customary to utilize the space immediately below the grate, designated by the reference numeral 25, as a chamber for combustion air, from which chamber the said air passes freely between the beams 3 to the tuyères, the combustion air being fed to the chamber 25 under pressure by suitable blower apparatus. Air also has access from the chamber 25 to the under side of the retorts. In the operation of the stoker, it is essential, in order to prevent burning of the sides of the retorts, that a layer of green coal be maintained between the banks of tuyères. Maintenance of this layer of green coal has heretofore been extremely difficult by reason of leakage of air from the chamber 25 into the bottoms of the retorts, this air supporting combustion of the coal within the retorts below the level of the tuyères and on occasions resulting in an increase in temperature sufficient to cause the melting of the entire retort. In accordance with the present invention, I provide means for effectively sealing the bottoms and sides of the retorts to exclude combustion air from the retorts and from the fuel-bed except that passing through the openings provided for the purpose in the tuyères.

With reference to Figs. 6 to 13, for example, it will be noted that the upper tuyère-supporting plate 4 therein illustrated is provided at its upper edge with a longitudinally extending groove 30, which groove is adapted to receive a suitable packing material sealing the joint between this upper edge of the plate 4 and the abutting edge of the upper side plate 16, see Fig. 1. The lower edge of the plate, see Fig. 8, has in its upper part a groove 31 which, extending downwardly from the upper edge of the plate 4, terminates in the front wall 32 of a recess 33. This groove 31, with a correspondingly formed groove 45 in the edge of the abutting side plate 5, forms a recess for reception of packing which seals the upper portion of the joint between these plates. The recess 33, as illustrated in Figs. 6 and 8, lies rearwardly of the forward face of the plate 4 and extends downwardly along the edge, and in conjunction with a corresponding recess 34 in the abutting end of the adjacent plate 5 forms a cavity against the forward face of which is secured in assembly a suitable gasket or packing strip 35 which overlies the joint between the ends of the plates 4 and 5, this packing strip being confined and held in position by a plate 36 which in turn is secured in position by bolts or studs 36a inserted through openings 37 in the forward faces of the plates 4 and 5 and threaded into the said plate 36. The openings 37 are countersunk on the forward faces of the plates, as illustrated in Fig. 7, for reception of the heads of the said securing bolts or screws, and in practice, the countersunk recesses are filled with a suitable refractory cement which covers the heads of the bolts and seals the openings through which the said bolts extend. The lower side edge portion of the plate 4 is provided with a recess 38 which with a corresponding recess 39 in the edge of the adjacent plate 5 forms a groove for reception of packing effectively sealing the lower portion of the joint between these adjacent plates. The recess 38 is extended along the bottom edge of the plate, as indicated at 40, and the extreme lower part of the groove 38 and the groove 40 cooperate with corresponding grooves in the abutting edge of the adjacent extension plate 15, see Fig. 1, to form a packing-receiving recess whereby this joint is sealed. The forms of the grooves 30 and 31 are illustrated respectively in Figs. 12 and 13.

In Figs. 14 to 17 inclusive I have illustrated one of the tuyère-supporting plates 5, together with the abutting end portion of an adjacent similar plate. In this instance, the opposite end edges of the plate 5 are identical, and as shown in Fig. 16, each is provided at the upper end with a groove 45, these grooves terminating in the recesses 34, which in assembly and as previously set forth form a space for reception of a suitable gasket 46 and for a backing member 47, corresponding respectively to the gasket 35 and clamping plate 36 previously described. The packing strip 46 overlies the joint between the end edges of the adjacent plates and thereby effectively seals these joints at the mid sections, while the upper and lower portions of the joint are respectively sealed by means of packing inserted in the grooves 45 and in grooves 48 in the lower portions of the end edges of the plates. The lower edge of the plate has a groove 49 which cooperates with corresponding grooves in the abutting edges of the extension plates 15 to receive suitable packing effectively sealing the joint at that edge.

Figure 5:
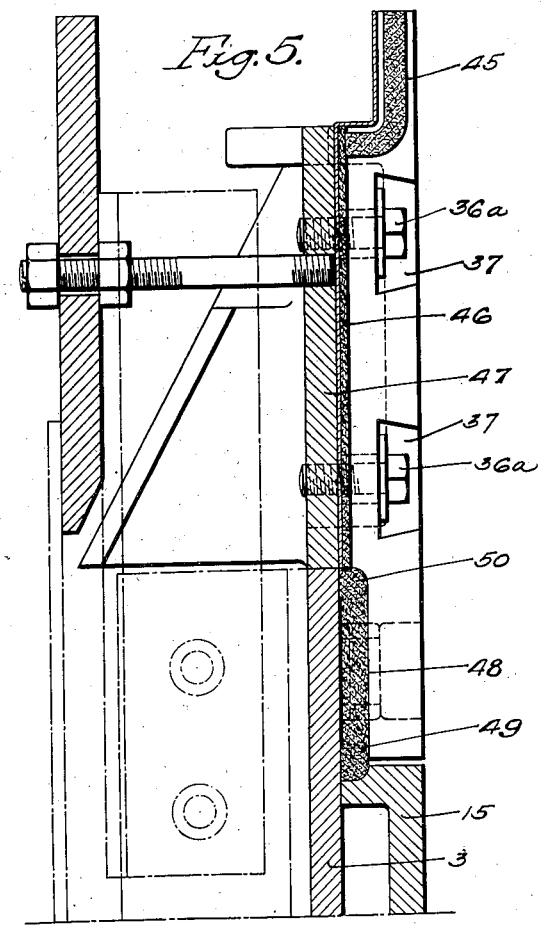
Fig. 5 is a section on the line 5—5, Fig. 4.

All the joints between the ends of the adjacent side plates 4, 5 and 6 are essentially the same, and one of the joints is illustrated in detail in Figs. 4 and 5, in which the various packing grooves and other elements are identified by the reference numerals used above.

The lowermost of the tuyère-supporting plates, designated 6 and illustrated in Figs. 18 to 22 inclusive, has an upper end edge formation similar to the end edges of the plates 5, and the corresponding parts are accordingly designated by the same reference numerals. Each of the plates 4, 5 and 6 has a longitudinal groove 50 which in assembly extends along and immediately below the upper edge of the beams 3 to which the said plates are secured. The grooves 50 and also the grooves 49, thus form continuous recesses extending substantially the entire length of the retorts at the upper edges of the beams 3, and these recesses when adequately packed with suitable packing create an effective seal preventing passage of air between the said beams and the plates.

One of the aforesaid extension plates 15 is illustrated in Figs. 23 to 25 inclusive, where it will be noted that these plates are provided in their upper and lower edges and in the forward inclined edge with a continuous groove 54, which grooves cooperate with the aforedescribed corresponding grooves in the abutting edges of adjacent plates 4, 5 and 15 to form recesses for the reception of suitable packing which effectively seals these joints.

As previously set forth, the top coal plate 7 and the plates 8, 9, 10, 11 and 12 extend transversely between the side walls of the retorts and form portions of the bottom wall thereof, the spaces between these plates being taken up by the pusher elements 13—14 which also as previously set forth, reciprocate to advance the fuel at a predetermined rate over the grate surface from top to bottom. In accordance with my invention, provision is made for sealing the joints between the sides of the aforesaid plates and the side walls of the retort. Thus, as illustrated in Figs. 26 to 29 inclusive, the top coal plate 7 is provided along its upper side edges with inwardly inclined longitudinal surfaces 61, these surfaces being terminated at the bottoms by an outwardly projecting flange 62 and each surface being provided with vertical recesses 63, 63. In assembly, the outer ends of the flanges 62 lie closely contiguous to the side walls of the retort formed by the plates 16 and 4 so that the inwardly inclined surfaces 61 above the flanges form a pocket adapted for reception of a suitable packing material, this packing entering the recesses 63, which thus tend to anchor the packing in position. This packing effectively seals the joints between the sides of the coal plate 7 and the side walls of the hopper. At its rearward end, the plate 7 is provided with a transverse recess 64 which extends completely across the extreme width of the plate and which is adapted for reception of a suitable packing material to thereby seal the joint between the rear end of the plate 7 and the front wall 17 of the stoker.

The plate 8 is illustrated in Figs. 30 to 32 inclusive. As therein shown, this plate 8, whose side edges abut the opposite side walls of the retort, is provided along its upper and lower longitudinal edges with grooves 66 adapted for reception of suitable packing which in assembly effectively seals the joint between the sides of this spacer plate and the walls of the retort. The grooves 66 at the opposite sides of the plate in effect constitute a continuous groove extending from the rear of the upper side edge of the plate forwardly and downwardly along the inclined forward portion, and from the lower end of the incline inwardly to a point intermediate the ends of the lower edge. Since the plates 9 are substantially identical with the plates 8, the said plates 9 are not specifically illustrated, although the longitudinal edges are recessed for reception of packing after the manner described above.

The bottom spacer plate 10 is illustrated in detail in Figs. 33 to 37 inclusive. In this instance, the plate has a major width in the rear portion adapted to extend between the sides of the adjacent beams 3 forming the lower sides of the retort. This portion of major width designated in the drawings by the reference numeral 71 is provided at its upper and lower longitudinal edges with recesses 72, this recess at each side extending from the extreme rear of the upper edge forwardly and down along the edge of the inclined portion 73, and from the apex of the inclined portion rearwardly along the lower side edge of the plate, as illustrated in Fig. 34. In this manner, a continuous packing groove is provided for the sides of the relatively wide rear portion 71 of the plate. It is to be noted that the inclined portion 73 abuts the under edges of the plates 5. The plate 10 further comprises a projecting portion 75 of lesser width than the rear portion 71 which extends between the upper side walls of the retort formed by the tuyère-supporting plates 5. As illustrated in Figs. 36 and 37, the upper side walls of the extension 75 are inclined inwardly towards the top, this inclined wall being terminated at the bottom by the inclined surfaces 73 and forwardly of the latter by a projecting flange 76 which constitutes bottom edge portions of the plate. The inclined surfaces 77 form with the side walls of the retort constituted by the plates 5 a pocket for reception of suitable packing material, and in order to more securely anchor the packing material in position, the inclined surfaces 77 are provided with vertical grooves 78 into which the mass of packing projects. It will be noted, therefore, that in the foregoing manner the joints between the opposite sides of the plate 10 and the side walls of the retort are effectively sealed.

It will be apparent from the foregoing description that I have provided a retort whose side walls are so constructed and sealed as to prevent passage of air therethrough into the retort. Likewise, the sealing as previously described, of the joints between the side walls of the retort and the various dead plates and pushers and between the said plates and pusher elements precludes the passage of any substantial amount of combustion air into the bottom of the retort. Exclusion of air precludes the possibility of combustion being set up and supported in the bottoms of the retorts below the level of the tuyères and thereby prevents damage to the retorts due to excessive temperatures of the burning fuel. This not only materially increases the durability of the stoker structure as a whole but by limiting the combustion air passing from the fuel bed to the tuyères, a materially better combustion control is obtainable and the efficiency of the stoker accordingly favorably affected.

It will be noted that the structural details of a stoker embodying my invention may vary widely.

I claim:

1. In an underfeed stoker, the combination with a combustion grate comprising a series of spaced parallel beams arranged in pairs, a plurality of abutting plates for each beam, said plates abutting the opposed faces of each pair and projecting a substantial distance thereabove, and forming the retort side walls, a longitudinal series of spaced dead plates arranged in step-like relation between and abutting the said opposed faces of said beams and abutting the lower edges of some of said plates, pusher elements operative between the dead plates, said dead plates and pusher elements forming the retort bottom, tuyère blocks bridging the side walls of adjacent retorts and forming with said walls, a tuyère chamber, and means for sealing the joints between said abutting plates to prevent the passage of air between said joints and into said retorts.

2. In an underfeed stoker, the combination with a combustion grate comprising a series of spaced parallel beams arranged in pairs, a plurality of abutting plates for each beam, said plates abutting the opposed faces of each pair and projecting a substantial distance thereabove, and forming the retort side walls, a longitudinal series of spaced dead plates arranged in step-like relation between and abutting the said opposed faces of said beams and abutting the lower edges of some of said plates, pusher elements operative between the dead plates, said dead plates and pusher elements forming the retort bottom, tuyère blocks bridging the side walls of adjacent retorts and forming with said walls, a tuyère chamber, means for sealing the joints between said abutting plates, and additional means for sealing the joints between said dead plates and said beams.

HERBERT E. PRESTON.